3,214,276
SEASONING CONTAINING SODIUM CYSTEINE-S-SULFONATE AND METHOD OF SEASONING FOODS THEREWITH

Eiichi Sakakibara, Amagasaki, and Fumio Hagihara, Nara, Japan, assignors to Yoshitomi Pharmaceutical Industries, Ltd., Osaka, Japan
No Drawing. Filed Mar. 8, 1963, Ser. No. 263,703
Claims priority, application Japan, Mar. 12, 1962, 37/9,593
8 Claims. (Cl. 99—140)

This invention relates to a new seasoning composition, a method for preparing the same, and a method for seasoning foodstuffs.

Monosodium glutamate, having good seasoning properties, has been known from old as a chemical seasoning. Besides this, sodium succinate, and recently 5'-ribonucleotides such as 5'-inosinic acid, 5'-guanylic acid and 5'-xanthylic acid have come to be known because of their characteristic good flavors, and they are now produced industrially and provided for popular uses.

Sodium cysteine-S-sulfonate, which is employed as a seasoning component in the new seasonings of the present invention, was studied in the past only as an intermediate in the sulfur-containing amino acid metabolism in micro-organisms, particularly as a substance participating in the cysteine biosynthesis, and nothing was known about its flavor and no trials were made to add it to foods and drinks for any purpose at all.

It has now been found that this compound, sodium cysteine-S-sulfontate, has a remarkable flavor, and that by adding this compound to foods and drinks, tastes and flavors of the foods and drinks are improved, the purpose of seasoning being achieved. It has further been found as the result of successive investigations that a significant synergy is present between sodium cysteine-S-sulfonate and monosodium glutamate and, moreover, that sodium cysteine-S-sulfonate has various effects, such as an action of stabilizing easily oxidizable materials in foods and drinks and an action of keeping freshness of appearances such as color and luster, none of which is found in so far known seasonings.

It is a principal object of the invention to provide a new seasoning composition which contains sodium cysteine-S-sulfonate as a seasoning component. This object includes provision of favorable seasonings prepared by addition of sodium cysteine-S-sulfonate to hitherto used chemical seasonings, for example, monosodium glutamate, 5'-nucleotides or seasonings containing them as the principal components.

It is a further object of the invention to provide a method for improving qualities of foods and drinks by stabilizing them and keeping their fresh appearances as well as by accentuating their tastes and flavors.

Sodium cysteine-S-sulfonate is represented by the following formula and can be synthesized by chemical means hereinafter mentioned and obtained as colorless crystals.

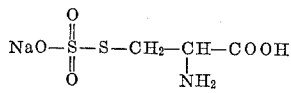

It is easily soluble in water, and also soluble in ethanol. It is stable in the aqueous solution around neutral and also stable on heating at usual cooking temperatures. It has a tendency to decompose on heating with strong alkali, but this cannot be an obstacle to the purposes of the invention, for almost all foods and drinks are about neutral to acidic but no strongly alkaline ones are conceivable.

Sodium cysteine-S-sulfonate is substantially innoxious to living bodies, as suggested by the fact that it has thus far been observed as an intermediate in the cysteine biosynthesis in the field of biochemistry. It can successively be taken orally as a seasoning without doing harm. What is better, it can be thought to rather contribute to amino acid metapolisms in living bodies. For example, the 50% lethal dose of the compound in mice is 2.34 g./kg. after radical administration of intravenous injection of 10% aqueous solution, representing its substantial innoxiousness.

Sodium cysteine-S-sulfonate can be produced industrially, for example, by dissolving l-cystine into a warm aqueous solution of sodium bicarbonate, adding sodium sulfite and ferrous sulfate to the solution, passing air through the solution at the room temperature to make the reaction proceed, concentrating the reaction mixture and recrystallizing the product from water or alcohol. Actually the compound being also an intermediate metabolite in certain microorganisms, cultivation of the microorganisms to accumulate the said intermediate can also attain the compound. Of course, sodium cysteine-S-sulfonate obtained by any other methods can be used in the embodiment of the invention.

Foods and drinks to be seasoned with seasonings or by seasoning methods of the present invention include meats and processed meats such as flesh of cattle and poultry, whale meat, ham, sausage, chikuwa (a kind of fish paste) and steamed fish paste; cereals and processed cereals such as rice, wheat and flour; vegetables and processed vegetables such as tomato, cabbage, spinach, carrot, egg-plant, potato, sweet potato, dehydrated spinach, dehydrated carrot and dehydrated potato; fruits such as apple, orange, persimmon and cherry; seasonings such as miso (bean paste), soy sauce, table salt, monosodium glutamate and 5'-nucleotides; fats and oils such as cottonseed oil, soy bean oil, olive oil and peanut oil; milks such as cow's milk and sheep's milk; emulsified fats and oils such as butter, margarin and mayonnaise; tsukudani (preserved foods boiled down in soy), juices and powdered juices, jams, ketchups, chilled confections such as ice cream as well as candies, and instant coffee.

The threshold value of sodium cysteine-S-sulfonate is estimated to be about 0.005%, which is considerably lower than those of monosodium glutamate or sodium 5'-inosinate reported to be 0.025%. Therefore, when sodium cysteine-S-sulfonate alone is used for seasoning purposes, it is desirable to add it to foods and drinks in an amount for the final concentration to be more than its threshhold value.

However, when sodium cysteine-S-sulfonate is used in combination with other chemical seasonings such as monosodium glutamate, sodium 5'-inosinate, and mixtures thereof, interesting synergy in the seasoning power is observed between sodium cysteine-S-sulfonate and afore-mentioned known seasonings. Therefore, when sodium cysteine-S-sulfonate is used in this way, it is effective in the amount below its threshold value, and the seasoning effect is perceptible at the level as low as about 0.001%–0.005%, although the said level varies according to the kind of foods and drinks to be seasoned. This synergy action can be seen, for instance, in the following experiments (Experiments 1–4).

EXPERIMENT 1

A control was prepared by adding 0.1% monosodium glutamate to an aqueous solution containing 0.6% table salt and 0.1% soy (total sodium chloride concentration was 0.8%). Three testing samples prepared by substituting a part of monosodium glutamate in the control by the equal weight of sodium cysteine-S-sulfonate. The three samples were subjected to sensory test by a panel of nine persons whether they were more tasty than the control. The result is shown in Table 1.

Table 1

| Seasoning component | Control | Samples | | |
|---|---|---|---|---|
| Monosodium glutamate (percent) | 0.1 | 0.09 | 0.08 | 0.05 |
| Sodium cysteine-S-sulfonate (percent) | 0 | 0.01 | 0.02 | 0.05 |
| Number of persons who determined the sample more favorable than the control | | 7 | 6 | 9 |
| Number of persons who determined the sample less favorable than the control | | 2 | 3 | 0 |

EXPERIMENT 2

Eight grams of table salt, 1 gram of monosodium glutamate and 0.1 gram of sodium cysteine-S-sulfonate were dissolved in water, then the solution was evaporated to dryness under a reduced pressure, and the resulting mixture was pulverized to obtain a stable seasoning agent.

The potency of the seasoning thus obtained was tested in comparison with monosodium glutamate: An aqueous test solution was so prepared as to contain 0.91% of the seasoning—i.e., the test solution contained 0.8% of table salt, 0.1% of monosodium glutamate and 0.01% of sodium cysteine-S-sulfonate—while each control solution was also prepared to make it contain the illustrated amount in percentage of monosodium glutamate and 0.8% of table salt. It was tested by eight persons sensitive to taste and flavor which of the control solutions corresponded to the test solution in their taste and flavor. Table II shows the test result in number of persons whose sensitivity responded that the test solution corresponded to the control solution containing illustrated amount of monosodium glutamate.

Table II

Monosodium glutamate, percent:     Number of persons
  0.4 _____ 0
  0.3 _____ 1
  0.2 _____ 6
  0.1 _____ 1

From Table II it will be seen that in order to enhance the taste of a solution containing monosodium glutamate to the extent of that of a solution containing two times as much as the amount of monosodium glutamate, it was quite sufficient to add no more than 0.01% of sodium cysteine-S-sulfonate to the original solution.

EXPERIMENT 3

A stable seasoning enhanced in taste and flavor was prepared by dissolving 8 grams of table salt, 1 gram of monosodium glutamate and 0.2 gram of sodium cysteine-S-sulfonate in water, evaporating the solution to dryness under a reduced pressure and pulverizing the resulting mixture.

The potency of the seasoning thus obtained was tested in comparison with monosodium glutamate: An aqueous test solution was so prepared as to contain 0.92% of the seasoning—i.e., the test solution contained 0.8% of table salt, 0.1% of monosodium glutamate and 0.02% of sodium cysteine-S-sulfonate—while each control solution was prepared in the same manner as in Experiment 2. Test was also carried out in the manner as in Experiment 2 and the result is shown in Table III.

Table III

Monosodium glutamate, percent:     Number of persons
  0.4 _____ 7
  0.3 _____ 0
  0.2 _____ 1
  0.1 _____ 0

From Table III it will be seen that in order to enhance the taste of a solution containing monosodium glutamate to the extent of that of a solution containing four times as much as the amount of monosodium glutamate, it was quite sufficient to add no more than 0.02% of sodium cysteine-S-sulfonate to the original solution.

EXPERIMENT 4

A stable seasoning enhanced in taste and flavor was prepared by employing 8 grams of table salt, 0.2 gram of sodium cysteine-S-sulfonate and 0.5 gram of 5'-nucleotides and treating as in Experiment 2. Table IV shows the result of a similar test as that in Experiment 2, the sample being compared with solutions containing 5'-nucleotides instead of monosodium glutamate, the 5'-nucleotides consisting mainly of about equal amount of disodium 5'-inosinate and disodium 5'-guanylate. Each testing solution contained table salt in 0.8% amount.

Table IV

[The test solution (0.02% sodium crysteine-S-sulfonate plus 0.05% 5'-nucleotides in water)]

5'-nucleotides, percent:     Number of persons
  0.2 _____ 2
  0.15 _____ 7
  0.1 _____ 0
  0.05 _____ 0

From Table IV it will be seen that in order to enhance the taste of a solution containing 5'-nucleotides to the extent of that of a solution containing three times as much as the amount of 5'-nucleotides, it was quite sufficient to add no more than 0.02% of sodium cysteine-S-sulfonate to the original solution.

From the above Experiments 1-4 it is clearly seen that sodium cysteine-S-sulfonate used in combination with known chemical seasonings such as monosodium glutamate and 5'-nucleotides presents synergy in seasoning effect. To obtain favorable synergy effects it is desirable that the ratio by weight of sodium cysteine-S-sulfonate is about 0.05–1 relative to monosodium glutamate and about 0.1–10 relative to 5'-nucleotides such as sodium 5'-inosinate and sodium 5'-guanylate.

The following Experiment 5 shows that sodium cysteine-S-sulfonate may be used for the stabilization of easily oxidized components in foods and drinks.

EXPERIMENT 5

The stability of vitamin C in 10 mg. percent aqueous solution containing 10 mg. percent sodium cysteine-S-sulfonate was compared with that of vitamin C in 10 mg. percent aqueous solution containing no sodium cysteine-S-sulfonate. Vitamin C was determined by indophenol colorimetry.

Table V

| | Residual percentage of vitamin C | |
|---|---|---|
| | Without the addition of sodium cysteine-S-sulfonate | With the addition of sodium cysteine-S-sulfonate |
| | Percent | Percent |
| After heating at 95° C. for 60 minutes | 14 | ca. 40 |
| After heating at 30° C. for 5 hours | 8 | ca. 50 |

It can be seen, as this data shows, that sodium cysteine-S-sulfonate has a tendency to prevent degradations of easily oxidizable components such as vitamin C in its presence.

When the stabilization of vitamin C with sodium cysteine-S-sulfonate is aimed at, about 0.5 mole of sodium cysteine-S-sulfonate is sufficient to stabilize 1 mole of vitamin C. More sodium cysteine-S-sulfonate may be used, but the oxidation preventing effect seems to level off.

Sodium cysteine-S-sulfonate added in processed meats or fish meats such as ham, sausage and steamed fish paste not only presents good taste and flavor as much as monosodium glutamate, but also improves appearance, preventing discoloration and increasing freshness of the products. Experiments 6 and 7 are the examples to show this effect.

EXPERIMENT 6.—SAUSAGE BASED ON FISHES

Minced fish meats shown in the following table and auxiliaries shown in the table were made into sausage (A) by the usual method. In the same way sausage (B) was prepared from the same raw materials with additional 8.4 grams of sodium cysteine-S-sulfonate (about 0.1% to the product).

| Fishes: | G. |
|---|---|
| Tunny | 1,200 |
| Whale | 1,400 |
| Shark | 1,100 |
| Saurel | 1,600 |
| Sea eel | 700 |
| | 6,000 |
| Auxiliaries: | |
| Starch | 726 |
| Lard | 340 |
| Table salt | 193 |
| Monosodium glutamate | 45 |
| Sugar | 120 |
| Pepper | 40 |
| Phosphates [1] | 18.16 |
| Nutmeg | 9 |
| Onion powder | 23 |
| 5-nitro-2-furaldehyde semicarbazone | 7 |
| Food red No. 3 [2] | 0.27 |
| Ascorbic acid | 1.14 |
| Ginger | 7 |
| Sodium succinate | 4 |
| Saccharin sodium | 1 |
| Sodium nitrite | 3.4 |
| | 1,537 |

[1] Mixture of sodium polyphosphate, sodium metaphosphate and sodium pyrophosphate.
[2] Erythrosine.

The finished products (A) and (B) were compared and the following was observed:

Taste: (B) was more favorable,
Flavor: Characteristic fish odor had been removed in (B),
Appearance: The red color of (B) was vivid, but the color of (A) was dark.

Another product containing therein 0.05% sodium cysteine-S-sulfonate also had a vivid red color clearly distinctive from that of (A).

EXPERIMENT 7.—STEAMED FISH PASTE

In this example, as in the preceding one, two pieces of steamed fish paste were compared. One (A) was produced from the raw materials hereinafter tabulated, and the other (B) from the same materials with the addition of 1.1 grams of sodium cysteine-S-sulfonate (about 0.1% to the product).

| Raw materials: | G. |
|---|---|
| *Sciaena shlegelii* | 500 |
| *Saurida argyroplanes* | 200 |
| Sea eel | 200 |
| Shark | 100 |
| Starch | 100 |
| Table salt | 30 |
| Monosodium glutamate | 16 |
| | 1,146 |

The washed and minced fish meats and auxiliary materials were mixed thoroughly in a mortar, each 50 grams of the mixture was shaped semicircular on a wood tip and placed in a steamer, and steamed for about 20 minutes from the beginning of boiling of water in the steamer. The finished products were compared as follows:

Taste: (B) was more favorable,
Flavor: Characteristic fish odor was absent in (B),
Appearance: (B) was whiter.

The whiter steamed fish paste is, the more highly it is ranked. Therefore, heretofore it has been bleached with hydrogen peroxide solution, but the bleaching is unnecessary when employing the method according to the invention.

In the practice of the method of the invention, the objective foodstuffs of the invention may be impregnated in the solution containing sodium cysteine-S-sulfonate or sprayed over with the said solution when they are solids. The solution of sodium cysteine-S-sulfonate may also contain sizings such as dextrin, arginates and carboxymethylcellulose, surface active agents such as polyethylene glycol, polypropylene glycol and higher aliphatic carboxylic acid esters of sorbitan or so, polyols and others. Suspensions in volatile organic solvents may also be used.

When objective foodstuffs are liquids or pastes sodium cysteine-S-sulfonate may be mixed therewith by dissolving or emulsifying it with or without the aid of above-mentioned surface active agents or others.

When objective foodstuffs are processed products, sodium cysteine-S-sulfonate may be added thereto in one or more of the production processes by impregnating, spraying, emulsifying, dispersing and the like.

The effects of the invention may be summarized with examples of foods and drinks as follows:

In the case of meats—sodium cysteine-S-sulfonate prevents discoloration and deterioration, keeps freshness and vivid appearance, and strengthens taste and flavor;
In the case of ham, sausage, chikuwa (a kind of fish paste) and steamed fish paste—it prevents deterioration and change of color and appearance, accentuates taste and flavor, and removes characteristic fish odor when fish is used;
In the case of cereals, vegetables and fruits—it keeps freshness and vivid color;
In the case of dried vegetables—it improves restorability, that is, vegetables restored with water are almost the same as fresh ones;
In the case of seasonings—it particularly strengthens taste and flavor and prevents deterioration and discoloration;
In the case of fats and oils—it prevents decomposition; and
In the case of butter, margarin and mayonnaise—it keeps color and luster, prevents deterioration, discoloration and decomposition, and strengthens taste and flavor.

What is claimed is:

1. A method for seasoning foodstuffs which comprises adding thereto sodium cysteine-S-sulfonate in an amount in excess of the threshold value thereof.

2. The method as claimed in claim 1, in which the ratio by weight of sodium cysteine-S-sulfonate to foodstuffs is in the range of 0.05%–1%.

3. A method for seasoning foodstugs which comprises adding thereto sodium cysteine-S-sulfonate in combination with monosodium glutamate, the weight ratio of sodium cysteine-S-sulfonate to monosodium glutamate being in the range of 0.05 to 1.

4. A method for seasoning foodstuffs which comprises adding thereto sodium cysteine-S-sulfonate in combination with 5'-nucleotide, the weight ratio of sodium cysteine-S-sulfonate to 5'-nucleotide being in the range of from 0.1 to 10.

5. A method for seasoning foodstuffs which comprises adding thereto sodium cysteine-S-sulfonate in combination with monosodium glutamate and 5'-nucleotide, the weight ratio of sodium cysteine-S-sulfonate to monosodium glutamate and 5'-nucleotide being in the range of from 0.05 to 1 and 0.1 to 10 respectively.

6. A seasoning composition consisting essentially of sodium cysteine-S-sulfonate and monosodium glutamate, the weight ratio of sodium cysteine-S-sulfonate to monosodium glutamate being from 0.05 to 1.

7. A seasoning composition consisting essentially of sodium cysteine-S-sulfonate and 5'-nucleotide, the weight ratio of sodium cysteine-S-sulfonate to 5'-nucleotide being from 0.1 to 10.

8. A seasoning composition consisting essentially of sodium cysteine-S-sulfonate, monosodium glutamate and 5'-nucleotide, the weight ratio of sodium cysteine-S-sulfonate, to monosodium glutamate and 5'-nucleotide being from 0.05 to 1 and 0.1 to 10 respectively.

References Cited by the Examiner

UNITED STATES PATENTS

| | | | |
|---|---|---|---|
| 1,680,865 | 8/28 | Fujii | 99—16 |
| 2,920,965 | 1/60 | Ziegler et al. | 99—140 X |
| 2,928,740 | 3/60 | Rosenthal et al. | 99—96 X |
| 3,102,033 | 8/63 | Jackel | 99—96 X |
| 3,104,171 | 9/63 | Sakaguchi et al. | 99—16 X |
| 3,109,741 | 11/63 | Toi et al. | 99—16 X |

OTHER REFERENCES

"Chem. Abs.," vol. 57, November 1962, 14282g.

De Marco et al., "Cystine Cleavage in Alkaline Medium," Archives of Biochemistry and Bisphysics," vol. 100, No. 1 (January 1963), pp. 51 to 55.

Jacobs, "The Chemistry and Technology of Food and Food Products," vol. I, 1951, Interscience Publishers Inc., New York, p. 220.

A. LOUIS MONACELL, *Primary Examiner.*

BEATRICE H. STRIZAK, *Examiner.*